(12) United States Patent
Kuempel

(10) Patent No.: US 8,789,458 B2
(45) Date of Patent: Jul. 29, 2014

(54) BREWING SYSTEM

(75) Inventor: Jeremy J. Kuempel, Cincinnati, OH (US)

(73) Assignee: Massachusetts Institute of Technology, Cambridge, MA (US)

( * ) Notice: Subject to any disclaimer, the term of this patent is extended or adjusted under 35 U.S.C. 154(b) by 353 days.

(21) Appl. No.: 13/334,134

(22) Filed: Dec. 22, 2011

(65) Prior Publication Data

US 2012/0186456 A1 Jul. 26, 2012

Related U.S. Application Data

(60) Provisional application No. 61/436,344, filed on Jan. 26, 2011.

(51) Int. Cl.
| | | |
|---|---|---|
| *A47J 31/44* | (2006.01) | |
| *A47J 31/36* | (2006.01) | |
| *A47J 31/06* | (2006.01) | |

(52) U.S. Cl.
CPC .......... *A47J 31/3619* (2013.01); *A47J 31/3609* (2013.01); *A47J 31/36* (2013.01); *A47J 31/0605* (2013.01); *A47J 31/0663* (2013.01)
USPC .............................. 99/297; 99/299; 99/302 P

(58) Field of Classification Search
CPC .............. A47J 31/3609; A47J 31/3619; A47J 31/0605; A47J 31/0621; A47J 31/0663
USPC .............................. 99/297, 302 P, 299, 302 R
See application file for complete search history.

(56) References Cited

U.S. PATENT DOCUMENTS

| | | | | | |
|---|---|---|---|---|---|
| 4,796,521 | A | * | 1/1989 | Grossi ............................ | 99/287 |
| 4,832,951 | A | * | 5/1989 | Chang-Diaz .................. | 424/520 |
| 7,673,555 | B2 | * | 3/2010 | Nosler et al. .................... | 99/279 |
| 7,717,026 | B1 | * | 5/2010 | Lassota .......................... | 99/283 |
| 8,402,882 | B2 | * | 3/2013 | De' Longhi ................ | 99/289 R |
| 8,495,950 | B2 | * | 7/2013 | Fedele et al. .................... | 99/299 |
| 8,601,937 | B2 | * | 12/2013 | Campetella et al. ........... | 99/286 |
| 2010/0166928 | A1 | * | 7/2010 | Stamm et al. ................. | 426/435 |
| 2010/0209577 | A1 | * | 8/2010 | Doglioni Majer ............ | 426/433 |
| 2012/0328748 | A1 | * | 12/2012 | Doglioni Majer ............ | 426/231 |

OTHER PUBLICATIONS

"Coffee Flavor—The Taste Characteristics of Coffee". Gourmet-Coffee-Zone-Online, Ed. Mark Harris. Gourmet Coffee Society, Dec. 2010 <http://gourmet-coffee-zone.com/coffee-flavor.html>.
"Why does the Aerobie Aeropress Coffee Maker Brew a Richer Smoother Cup of Coffee or Espresso?" Aerobie, Inc. Jan. 2011. <http://www.aerobie.com/Products/aeropress_story.htm>.
Honan, Mathew. "The Coffee Fix: Can the $11,000 Clover Machine Save Starbucks?" Wire Magazine Online. Jul. 21, 2008. Dec. 2011. <http://wired.com/gadgets/miscellaneous/magazine/16-08/mf_clover>.
Luminairecoffee.com. Luminaire Coffee Company, Dec. 2010. <http://luminairecoffee.com/>.

* cited by examiner

*Primary Examiner* — Reginald L Alexander
(74) *Attorney, Agent, or Firm* — Sam Pasternack; MIT Technology Licensing Office

(57) ABSTRACT

The system includes a vertically-oriented cylinder sized to receive a selected amount of water and a substance such as coffee to be brewed. A plunger is slidingly received within the cylinder. A filter assembly separates the grounds from the brewed drink. A heating element is wrapped around the cylinder to maintain a selected temperature within the cylinder.

1 Claim, 5 Drawing Sheets

BREWING SYSTEM

This application claims priority to provisional application Ser. No. 61/436,344 filed Jan. 26, 2011. The contents of this provisional application are incorporated herein by reference.

BACKGROUND OF THE INVENTION

This invention relates to a brewing system, and more particularly to a brewing system that controls parameters affecting the taste and quality of a brewed beverage such as coffee.

Coffee is a commonly drunk beverage that provides its drinkers with an energy boost. The full process of harvesting, roasting, and brewing coffee beans to produce the coffee drink is complex, with many steps that affect the flavor of the resulting drink. The initial stages of the process have been optimized by coffee producers such that the average consumer can purchase professionally roasted beans that are consistent in their quality and flavor. However, coffee brewing techniques remain either inconsistent or incapable of harnessing the full potential of the beans. Coffee has been found to contain more than 800 flavor components (twice as many as red wine), indicating that careful brewing could reveal new tastes.

Brewing is the final step of the coffee-making process and is in principle as simple as mixing ground coffee with water. There are many types of coffee brewing devices, but almost all of them fit into one of the following six categories: drip brewers, espresso machines, pod brewers, full immersion brewers, vacuum brewers, and percolators. For all brew techniques there are four main variables that affect the flavor of the coffee drink: the brew temperature, the dose (proportion of coffee to water), the immersion time, and the agitation or mixing during the brew. Pressure may also be an important parameter.

It is therefore an object of the present invention to provide a brewing system that allows control of the parameters important for producing coffee having exceptional flavor and quality.

SUMMARY OF THE INVENTION

The brewing system according to the invention includes a cylinder that can be sealed and reopened on one end and is sealed on the opposite end by a moveable plunger that is slidingly received. A valve and filter are disposed at the sealable end such that, when the valve is open, compressive motion of the plunger will cause the contents of the chamber to pass through the filter before exiting the chamber. Heating and cooling elements are integrated with the cylinder to maintain its temperature. Upon activation of the plunger, the contents within the cylinder develop increased pressure as the volume of the chamber is reduced. This pressure can be regulated by adjusting the position of the plunger, as well as by incorporating a pressure release system. In a preferred embodiment, a pressure sensor is included to assist in automated pressure control. Modulating the temperature can also change the pressure. At a selected time the valve is opened, allowing a brewed drink to be expelled from the cylinder. In a preferred embodiment, the cylinder includes an opening for introducing water and the substance to be brewed into the cylinder. The system also includes a structure for pushing the plunger along the cylinder. Suitable structures for pushing the plunger includes a rack and pinion arrangement driven by an electric motor or manual actuation using a linkage system.

In a preferred embodiment, the system includes a temperature sensor such as a thermocouple within the cylinder responsive to the water temperature for controlling the heating element. In a preferred embodiment, the filter assembly can be unlatched from the cylinder in a manner similar to portafilters on current espresso machines.

In yet another embodiment, a microcontroller is provided for controlling brewing time and temperature. In this embodiment, the microcontroller may execute proportional, integral, derivative (PLD) control to regulate the heating element. A touch screen may be provided for controlling the microcontroller. A suitable valve is a pressure activated valve.

DESCRIPTION OF THE PREFERRED EMBODIMENT

Figure 1:
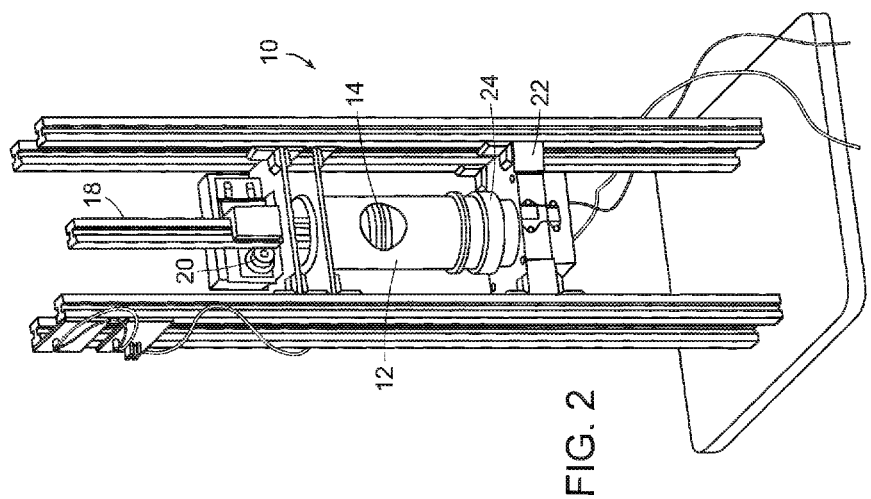
FIG. 1 is perspective view of the apparatus according to an embodiment of the invention.
Figure 2:
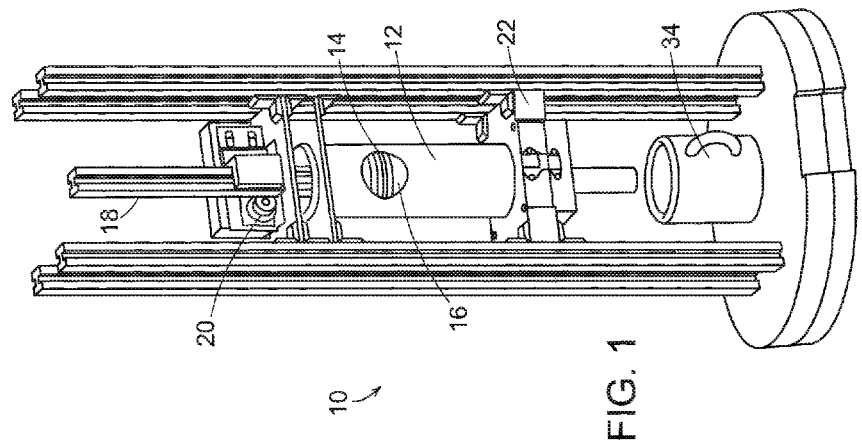
FIG. 2 is a photograph of the apparatus of an embodiment of the system showing the various components.

With reference first to FIGS. 1 and 2 the brewing system 10 includes a vertically disposed cylinder 12 that forms a brewing chamber therein and includes an opening 14 through which ground coffee and water are introduced into the cylinder 12. A plunger 16 shown within the opening 14 is supported for movement within the cylinder 12. The plunger 16 is moved by the interaction of a gear rack 18 in combination with a pinion gear 20 driven by an electric motor. A thermocouple (not shown) is located within the cylinder 12 for immersion in the brewing water. A lower hinge/filter assembly 22 allows the coffee grounds to be removed after brewing is complete.

As shown in FIG. 2 a heating element 24 such as a heating pad is wrapped around the exterior of the cylinder 12 to provide for temperature control of the water during the brewing process. The cylinder 12 may be made of a plastic material, glass, or a metal such as stainless steel.

Figure 3:
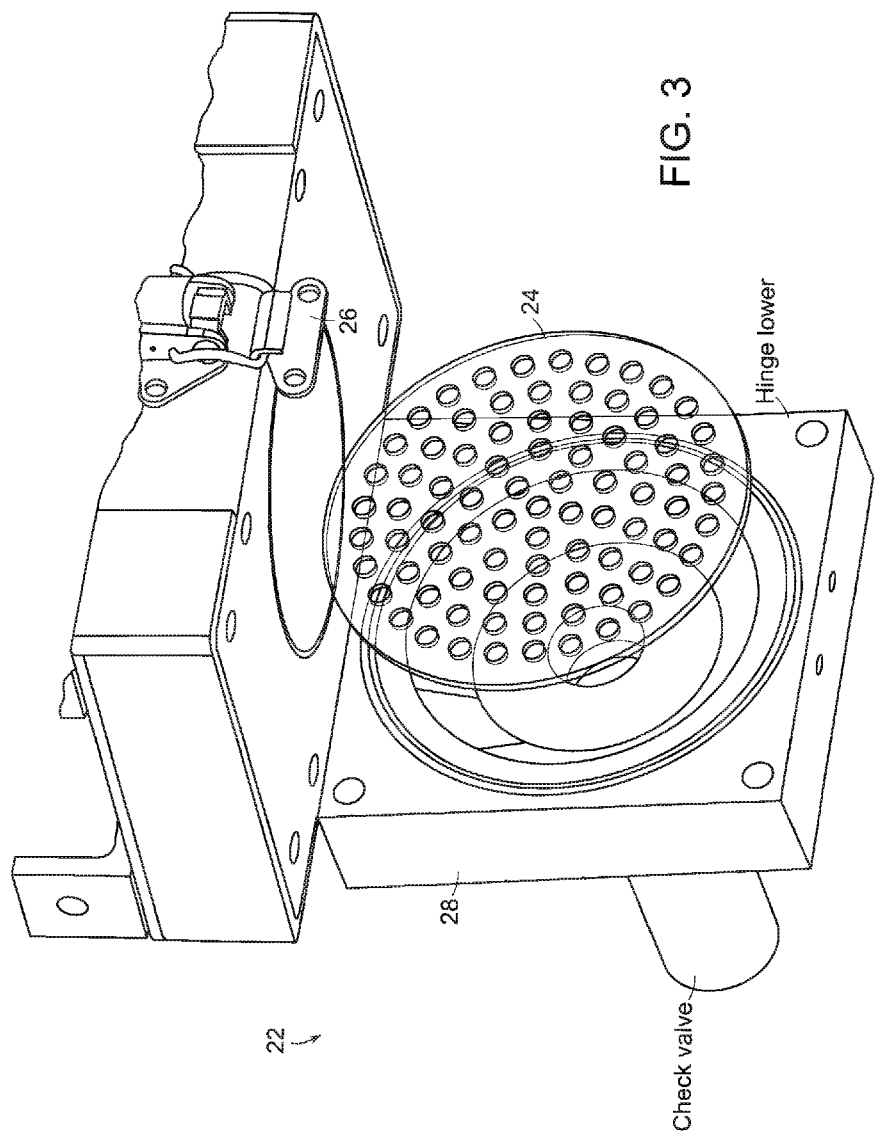
FIG. 3 is a perspective view of the filter assembly according to an embodiment of the invention.
Figure 4:
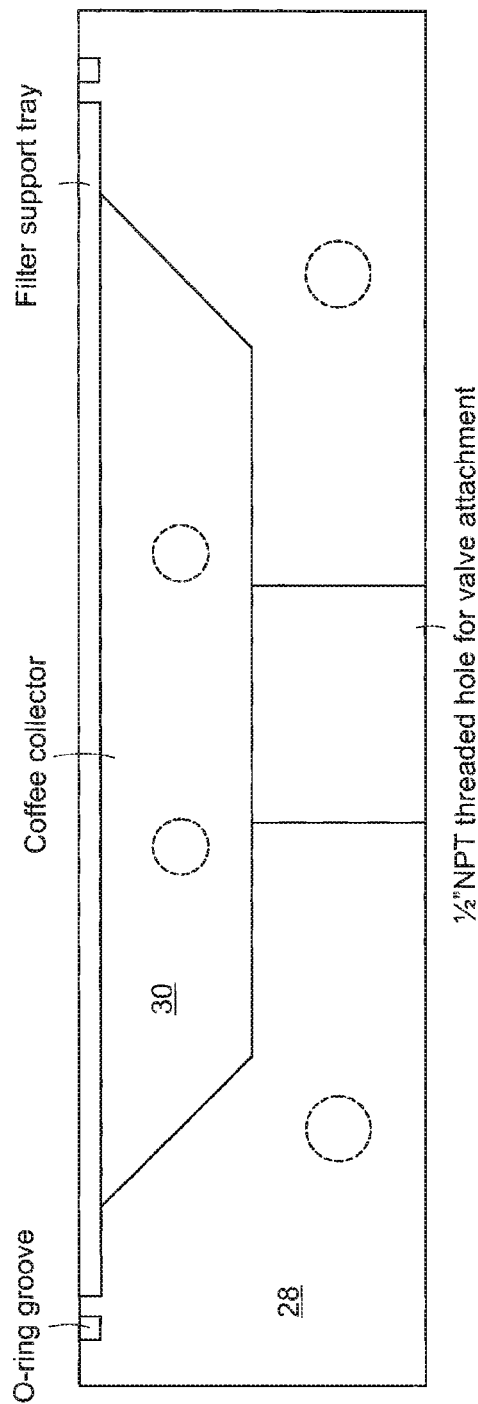
FIG. 4 is a cross-sectional view of a bottom portion of the filter assembly.

FIG. 3 shows the hinge/filter assembly 22 in more detail. A filter support 24 supports a conventional paper filter (not shown) for filtering the brewed beverage, a compatible metal or glass filter could also be used. This unit is secured by means of a latch 26. As shown in FIG. 4 a lower portion of the hinge assembly 28 includes a depressed region 30 for collecting brewed coffee after it passes through the filter. The depressed region guides coffee towards the valve, which is sized for a ½" NPT threaded hole in this preferred embodiment.

Figure 5:
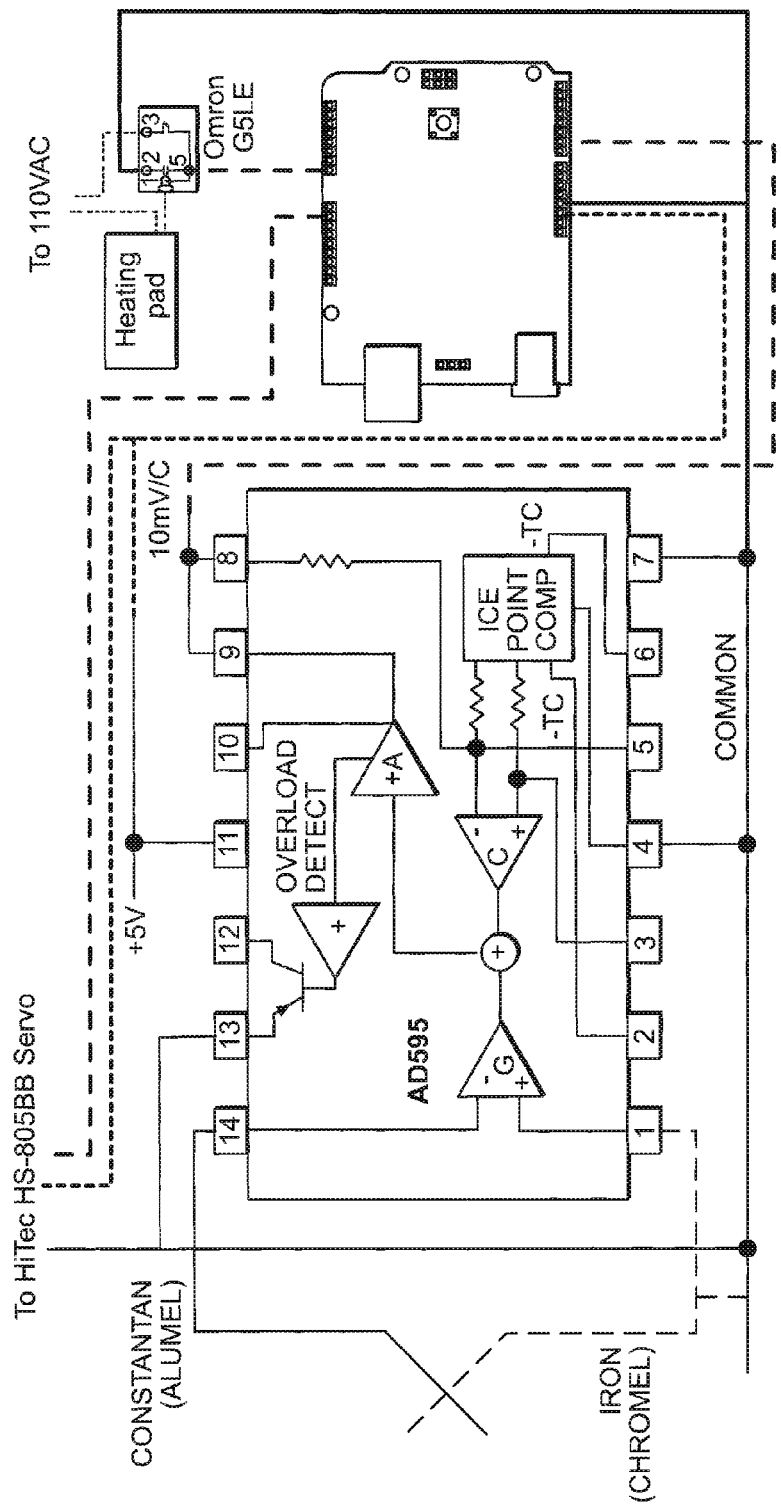
FIG. 5 is an electrical schematic diagram for controlling the brewing system of the invention according to a preferred embodiment.
Figure 6:
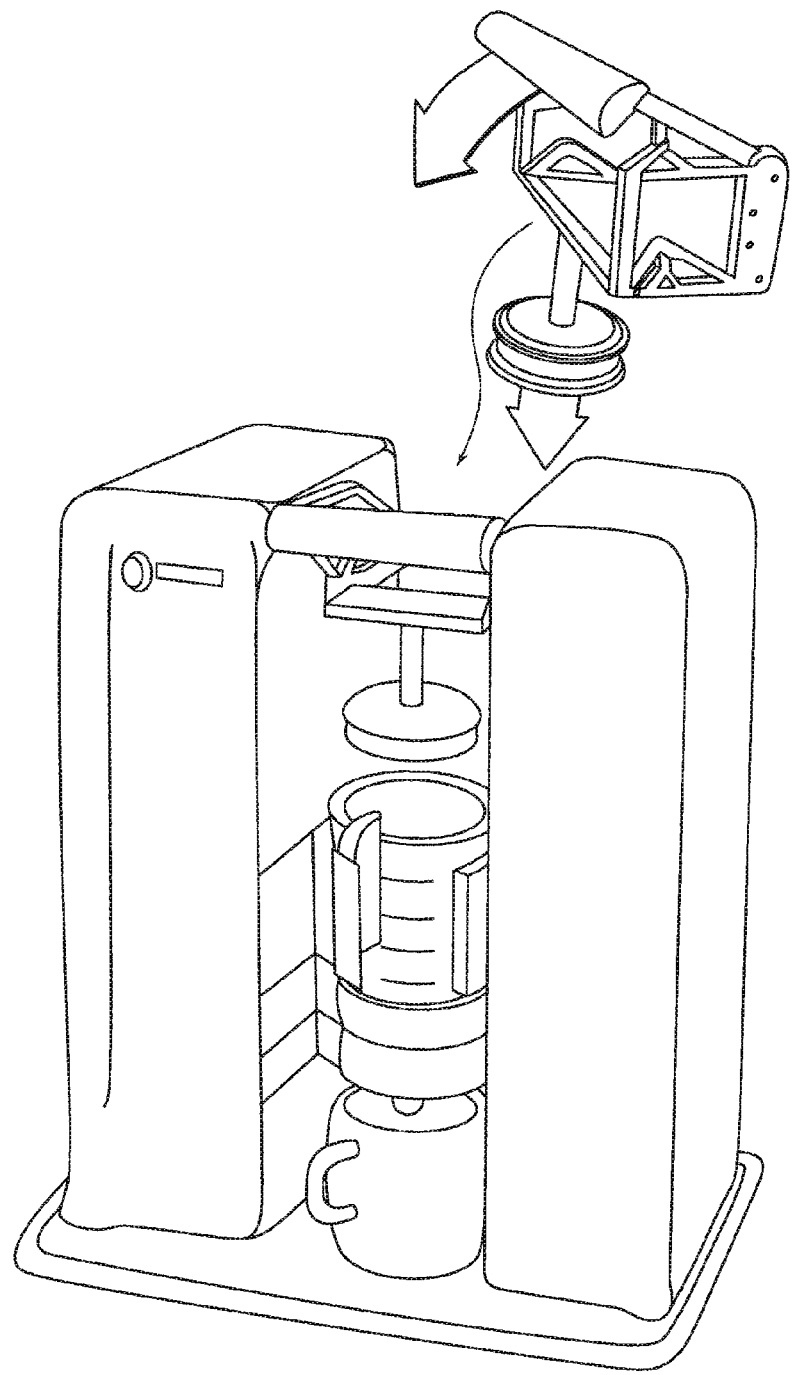
FIG. 6 is a perspective view of another embodiment of the invention.

FIG. 5 shows the electronics for controlling the plunger 16 and the heating pad 24. In this embodiment, an Arduino controller 32 is provided. FIG. 6 shows another design of the brewing system disclosed herein.

The operation of the brewing system of the invention will now be discussed. To begin the brewing process, ground coffee and water are introduced into the cylinder 12 through the opening 14. The water should be at an appropriate temperature when it is introduced. During the brewing process, the heating element 24 is activated to maintain the water temperature at a desired value throughout the brewing process using input from the thermocouple located within the brew chamber of the cylinder 12.

After the heated water and ground coffee are introduced into the cylinder 12 through the opening 14 with the plunger 16 retracted, the pinion 20 and rack 18 are activated to provide pressure on the contents within the cylinder 12. The microcontroller 32 also controls the length of time for the brewing process that is selected by the user. At the end of the brewing time a valve is opened and the plunger 16 is driven downwardly within the cylinder 12 to force the contents within the cylinder 12 through the filter assembly 22 thereby delivering the brewed beverage to a cup 34.

After the brewed coffee is delivered to the cup 34, the filter assembly 22 may be opened using the latch 26 so that the used coffee grounds may be removed. Because the system disclosed herein carefully controls the temperature, pressure, and time of brewing, an exceptional cup of coffee is produced.

The brewing system disclosed herein may include Internet connectivity using, for example, a touch screen to control the microcontroller. A possible usage of internet connectivity could include smart recommendations for food or drinks based on information received from a social network such as Facebook or Twitter, or using a predictive algorithm such as Pandora's music recommendations. An internet connected touchscreen enabled coffee machine could also feature an integrated marketplace for coffee-related products performing a function similar to the function Apple Inc's iTunes performs for the iPod. It could also feature an app store that could contain user-generated apps providing functions like RSS readers, smart validation for location-based deals or daily deals, weather and horoscope. Internet connectivity could also allow for charitable donations directly to coffee producing countries or farmers, or other individuals or organizations.

Those of skill in the art will recognize that the brewing system disclosed herein can be used for other purposes. Possible usages could include maté or tea brewing; preparation of chemical or biological samples for research purposes; cooking of food in a manner similar to a sous vide or pressure cooker; pressure, humidity, salinity, and temperature cycling of electronic or mechanical components for reliability testing purposes. For all of these functions, including coffee brewing, the materials could be packaged prior to usage in the coffee brewer in a way that makes preparation and clean up easier.

Additional detail about the brewing system disclosed herein may be found in the provisional application referred to earlier and incorporated herein by reference. Other substances such as tea may be used instead of coffee.

It is recognized that modifications and variations of the invention disclosed herein will be apparent to those of ordinary skill in the art and it is intended that all such modifications and variations be included within the scope of the appended claims.

What is claimed is:

1. Brewing system comprising:
a cylinder having a top and a bottom end, the cylinder sized to receive water and a substance to be brewed;
a plunger slidingly positioned within the cylinder at the top end;
a valve disposed at the bottom end of the cylinder;
a filter assembly disposed above the valve; and
a heating element for maintaining a selected temperature within the cylinder, whereby upon activation of the plunger, the contents within the cylinder are pressurized to a selected value and, at a selected time, the valve is opened, allowing a brewed drink to be expelled from the cylinder wherein the filter assembly is hinged, allowing the filter assembly to be opened for disposal of the brewing substance.

* * * * *